US009634418B2

(12) United States Patent
Demazeau et al.

(10) Patent No.: US 9,634,418 B2
(45) Date of Patent: Apr. 25, 2017

(54) SOCKET FOR VEHICLE PASSENGER COMPARTMENT

(71) Applicant: Valeo Vision, Bobigny (FR)

(72) Inventors: Jean-Yves Demazeau, Aussillon (FR); Benoit Descazeaux, Castres (FR); Sylvain Fournier, Villecomtal (FR); Matthieu Bernable, Castres (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 14/980,149

(22) Filed: Dec. 28, 2015

(65) Prior Publication Data

US 2016/0197428 A1 Jul. 7, 2016

(30) Foreign Application Priority Data

Jan. 6, 2015 (FR) ..................................... 15 50050

(51) Int. Cl.

*H01R 13/40* (2006.01)
*H01R 43/20* (2006.01)
*B60Q 3/00* (2017.01)
*H01R 13/642* (2006.01)
*H01R 29/00* (2006.01)
*H01R 13/428* (2006.01)
*H01R 13/645* (2006.01)

(52) U.S. Cl.

CPC ............ *H01R 13/40* (2013.01); *B60Q 3/007* (2013.01); *H01R 13/642* (2013.01); *H01R 29/00* (2013.01); *H01R 43/20* (2013.01); *H01R 13/428* (2013.01); *H01R 13/645* (2013.01); *H01R 2201/26* (2013.01)

(58) Field of Classification Search

CPC ................................ H01R 12/69; H01R 24/58
USPC ......................................... 439/668, 669, 741
See application file for complete search history.

(56) References Cited

U.S. PATENT DOCUMENTS 1,090,528 A * 3/1914 Freeman ................ H01R 33/22 174/72 R
1,493,900 A * 5/1924 Seltzer ............... H01H 85/2005 439/734
1,643,655 A * 9/1927 Giles .................. H01R 33/9651 439/667
3,424,414 A * 1/1969 Horwitt .................... B60N 3/14 219/265
3,766,513 A * 10/1973 Carre .................. H01R 13/428 439/171
4,011,000 A * 3/1977 Wharton .................. B60N 3/14 439/445

(Continued)

FOREIGN PATENT DOCUMENTS

| | | |
|---|---|---|
| DE | 29724118 U1 | 2/2000 |
| EP | 0462900 A1 | 12/1991 |
| FR | 860162 A | 1/1941 |

*Primary Examiner* — Neil Abrams
(74) *Attorney, Agent, or Firm* — Jacox, Meckstroth & Jenkins

(57) ABSTRACT

An assembly for producing a socket for a vehicle passenger compartment comprises a metal socket body and contact element used to supply current to the metal socket body and includes fixing means and at least one electrical connection element. Each element is adapted to be fixed to the metal socket body so that only some of the fixing means of the socket body are used to fix it. With this structure, the same metal socket body may be used for differently formed connection elements.

20 Claims, 6 Drawing Sheets

(56) References Cited

U.S. PATENT DOCUMENTS 4,449,036 A * 5/1984 Seibel ........................ F23Q 7/00 219/264
4,498,726 A * 2/1985 Mattis ........................ F23Q 7/00 439/668
4,519,666 A * 5/1985 Williams ................. H01R 4/10 29/879
4,713,017 A * 12/1987 Pesapane ............. H01R 13/447 439/142
5,044,993 A * 9/1991 El-Haj ................... H01R 24/58 29/876
5,095,259 A * 3/1992 Bailey ..................... H01M 2/10 320/114
5,382,171 A * 1/1995 Hofmann ............. H01R 13/447 439/142
5,493,098 A * 2/1996 Diederich ................ B60N 3/14 219/265
5,780,813 A * 7/1998 Sire .......................... B60N 3/14 219/265
5,796,073 A * 8/1998 Mattis ........................ F23Q 7/00 219/265
5,831,246 A * 11/1998 Thivet ....................... B60N 3/14 219/265
5,900,172 A * 5/1999 Thivet ....................... B60N 3/14 219/265
5,928,539 A * 7/1999 Thivet ....................... B60N 3/14 219/265
5,993,262 A * 11/1999 Kowdynski ............ H01R 31/06 439/35
6,116,931 A * 9/2000 McCleerey .............. H01R 4/06 439/173
6,619,983 B2 * 9/2003 Ota ......................... H01R 24/58 439/521
8,215,999 B2 * 7/2012 Lau ...................... H01R 13/743 439/668
8,323,050 B2 * 12/2012 Stantchev .......... H01R 13/6395 439/34
8,579,641 B1 11/2013 Queru
8,939,781 B2 1/2015 Johnson
9,099,818 B2 * 8/2015 Ikeda ..................... H01R 24/38
2014/0120750 A1 5/2014 Johnson
2016/0254626 A1 * 9/2016 Demazeau ............... H01R 4/18

* cited by examiner

SOCKET FOR VEHICLE PASSENGER COMPARTMENT

CROSS-REFERENCE TO RELATED APPLICATIONS

This application claims priority to the French application 1550050 filed Jan. 6, 2015, which application is incorporated herein by reference and made a part hereof.

BACKGROUND OF THE INVENTION

1. Field of the Invention

The invention concerns sockets for vehicle passenger compartments.

2. Description of the Related Art

These so-called "12 volt" sockets, although they also accommodate voltages of 24 V, enable connection of electrical devices such as GPS devices, baby bottle heaters, electrical converters or chargers, etc.

There is known for this purpose a product of the applicant. This socket, situated at the level of or under the dashboard of the vehicle, comprises four components: a cap, a holding body comprising a so-called "negative" electrical connection tongue, a ring with an integrated connection body and a so-called "positive" electrical connection tongue. On opening the cap, the user can plug in one of their electrical devices.

The disadvantage of this product is that it is compatible only with vehicles manufactured by a limited number of motor vehicle manufacturers. Thus the socket body of the product is designed to accept only the appropriate negative electrical connection tongue.

A parallel product intended for another motor vehicle manufacturer comprises nine components, but those of these components that are similar to those of the first socket have different dimensions. The product matches the dimensions of the dashboard, its interior layout and the manufacturer's design. At nine, the number of components is relatively high, which generates costs, notably for the manufacture and inventory management of all these parts. Likewise, the socket body for the vehicles of this manufacturer is designed to accept only the negative electrical connection tongue designed for those vehicles. The same disadvantage applies to other manufacturers supplied with vehicle passenger compartment sockets by the applicant.

The same situation may arise for other suppliers of sockets for vehicles, who must then produce a plurality of different products for the various manufacturers, although the components of those products are similar.

SUMMARY OF THE INVENTION

An object of the invention is to propose a product that can be adapted to a plurality of types of manufacturers.

To this end there is provided an assembly for producing a socket for a vehicle passenger compartment, the assembly comprising:

a socket body including fixing means; and at least one electrical connection element adapted to be fixed to the body so that only some of the fixing means of the body are used to fix it.

The socket body is therefore compatible with a plurality of different electrical connection elements, for example so-called negative connection tongues, and it is no longer obligatory to design a socket body for each different socket type corresponding to a different motor vehicle manufacturer. This also enables the socket to be manufactured from a relatively small number of parts, for example five parts (see below).

The assembly advantageously comprises at least two different electrical connection elements, each element being adapted to be fixed to the body in at least one predetermined position on the body such that the other element(s) cannot then be fixed to the body in the corresponding predetermined position.

The body preferably includes at least one hole for fixing the element or each element to the body in the corresponding predetermined position.

The body advantageously includes at least two holes, and preferably four holes.

The element or each element is preferably adapted to be fixed to the body by means of at least two of the holes of the body.

To be more specific, after fixing the element or each element to the body in the predetermined position, at least one of the holes is disabled, and preferably two of the holes are disabled.

The socket body is therefore easy to manufacture because compatibility with the different electrical connection element or elements is linked to its number of holes and to their positions. Moreover, these holes provide for simple and rapid fixing.

The element or each element advantageously comprises a plane support, at least one finger projecting from the support and a tongue.

The element or each element preferably comprises two fingers.

The elements advantageously differ from one another by at least one position of the fingers on the support.

The elements advantageously differ from one another by at least one position of the tongue on the support.

The elements advantageously differ from one another by at least one dimension of the tongue.

The electrical connection element or elements are therefore different in terms of simple characteristics whilst having similar shapes.

The assembly advantageously further comprises at least one base adapted to be fixed in a predetermined position to the body.

The base or each base is preferably a ring.

There are advantageously at least two different bases, the bases having at least one identical part.

Each base is therefore adapted to retain the socket body whilst matching the particular characteristics of each socket type, for example the electrical connection elements of each socket type.

The base preferably includes a raised pattern projecting from a back of the base to form an abutment in the socket on receiving a connector.

The electrical connection element or elements being one or more first elements, the assembly advantageously further comprises at least two different second electrical connection elements.

Each second element preferably includes a substantially hexagonal electrical connection hole.

Other types of tongues, for example positive tongues, can therefore form part of the assembly and be arranged in conjunction with the socket body, knowing that each positive tongue corresponds to a particular base.

This abutment therefore protects the back in the event of excessively brutal insertion of the connector into the housing.

The assembly advantageously further comprises at least two different caps for closing a housing of the socket.

The caps preferably differ from one another by color.

The caps advantageously differ from one another by material.

The caps preferably differ from one another by a shape and/or a size.

The cap is therefore also adaptable for forming different sockets from the same basic components as indicated.

There is also provided in accordance with the invention a method of manufacturing a socket for a vehicle passenger compartment, wherein an assembly as described above is procured and the element or one of the elements is fixed to the body.

The element or one of the elements is advantageously fixed to the body by crimping.

There is also provided in accordance with the invention a socket for a vehicle passenger compartment produced by the above method.

There is also provided in accordance with the invention a socket intended for a vehicle passenger compartment and comprising:

- a socket body including fixing means; and
- an electrical connection element fixed to the body so that only some of the fixing means of the body are used to fix it.

There is finally provided in accordance with the invention a group of at least two sockets conforming to the preceding socket, the bodies of the two sockets being identical, the elements being different from one another and each being fixed to one of the socket bodies, the fixing of each element in its position making it impossible to fix the other element(s) to the same body at the corresponding position.

This provides at least two different sockets each produced with at least one identical element, namely the socket body.

These and other objects and advantages of the invention will be apparent from the following description, the accompanying drawings and the appended claims.

BRIEF DESCRIPTION OF THE ACCOMPANYING DRAWINGS

Embodiments of the invention are described next by way of nonlimiting example and with reference to the appended drawings, in which.

DETAILED DESCRIPTION OF THE PREFERRED EMBODIMENTS

Figure 1:
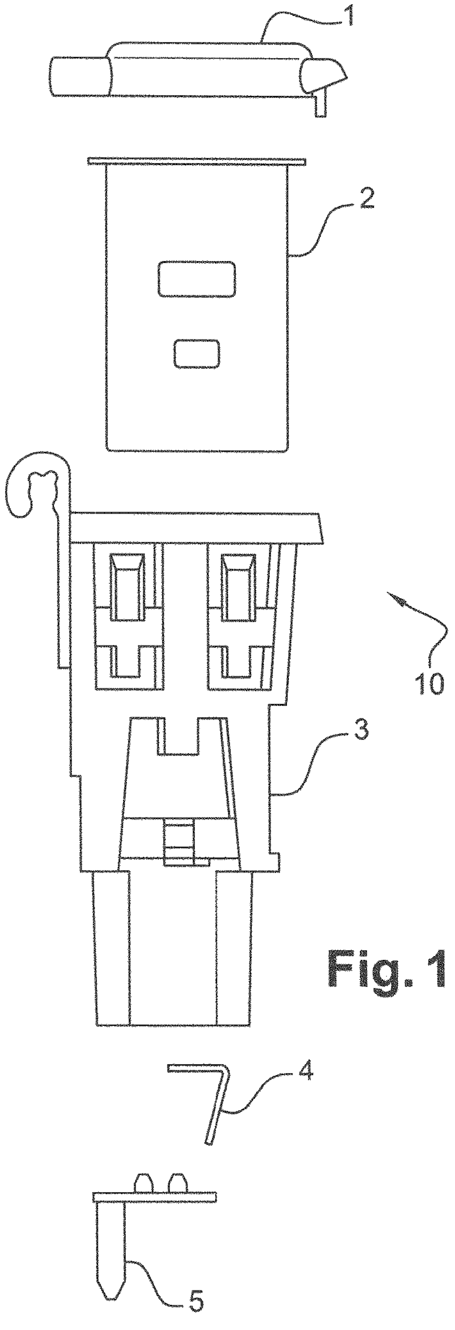
FIG. 1 is an exploded perspective view of a socket produced using an assembly in accordance with one embodiment of the invention.

FIG. 1 shows a 12 V socket outlet or power socket 10 for a vehicle passenger compartment produced using an assembly in accordance with one embodiment of the invention.

There are seen an opening cap 1 and a socket body 2, which is the only component of this assembly that is identical in all the sockets that are described. Also shown are a base or ring 3 adapted to receive the body 2, a first electrical connection element 5 referred to hereinafter as the negative tongue, and a second electrical connection element 4 referred to hereinafter as the positive tongue.

Figure 2:
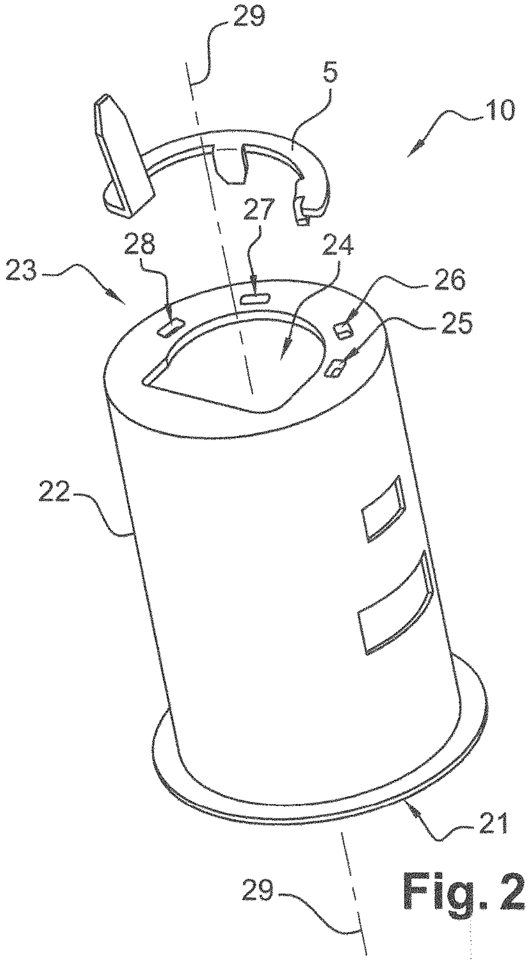
FIG. 2 is a perspective view of the body and a first electrical connection element of the socket from FIG. 1.

FIG. 2 shows more clearly the socket body 2 and the negative tongue 5. The socket body 2 is of tubular general shape in its main part 22, here a circular cylinder with an axis 29. One end 21 includes a circular rim or flange. The opposite end 23 has at the center a main hole 24 in the shape of a semicircle contiguous with a rectangle.

Around this main hole 24 there are arranged in a semicircle four smaller holes 25, 26, 27 and 28 that are identical to one another. These smaller holes 25, 36, 27 and 28 are rectangular in shape with rounded corners.

At the level of the walls of the main part 22, the socket body 2 has two rectangular holes extending circumferentially and aligned vertically, one of which is slightly longer than the other. As will emerge hereinafter, the four smaller holes 25, 26, 27 and 28 enable fixing at will of one of the first electrical connection elements, referred to in the description as a "negative tongue" 5, even though they differ from one another. The socket body 2 is therefore compatible with a plurality of negative tongues 5 but can receive only one of them at a time.

Figure 3:
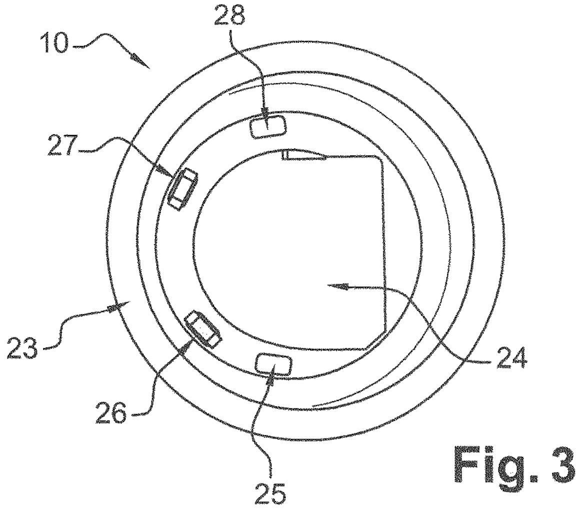
FIG. 3 shows the two components from FIG. 2 fixed to each other.
Figure 4:
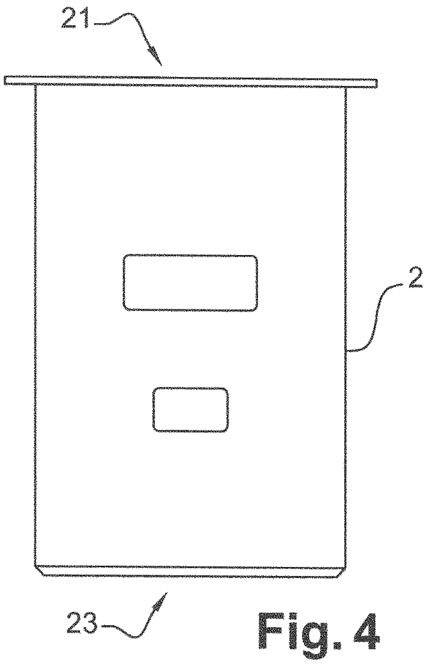
FIGS. 4 and 5 show the socket body from FIG. 2 respectively from the side and from below.
Figure 5:
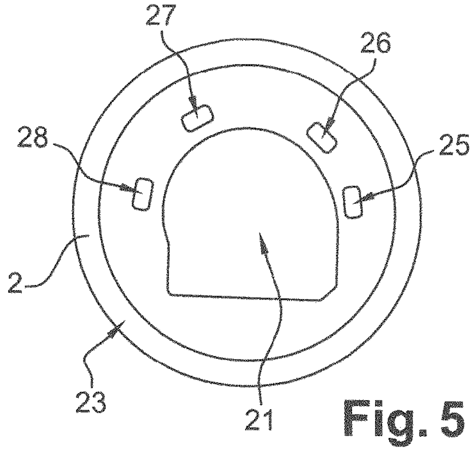

FIG. 3 shows, as seen from above, how the raised patterns on the negative tongue 5 fasten into the end 23 of the body 2.

Figure 6:
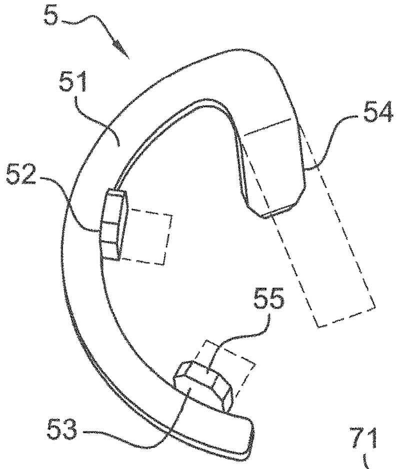
FIGS. 6, 7 and 8 are perspective views of three first electrical connection elements of the assembly in accordance with this embodiment of the invention.

This negative tongue 5 is also shown in detail in FIG. 6. It comprises a plane support 51 that is substantially semicircular in shape, two fingers 52 and 53 projecting from the plane support 51 and a projecting plane part 54 that forms the connection tongue as such. The fingers 52 and 53 and the tongue or projecting plane part 54 are oriented perpendicularly to the plane support 51, the fingers 52 and 53 being oriented in the opposite direction to the projecting plane part 54. The fingers 52 and 53 lie against the plane support 51, inside the semicircle that the latter forms, and have a narrower end 55. These fingers 52 and 53 are identical to one another. They could be different, however. The tongue or projecting plane part 54 is situated in line with the semicircle formed by the plane support 51. Where the manufacture of this first electrical connection element or negative tongue 5 is concerned, it is initially manufactured flat. The dashed lines moreover show the positions of the fingers 52, 53 and the or projecting plane part tongue 54 when the first electrical connection element or negative tongue 5 is flat. These connection elements or tongues 5 are produced by cutting a flat sheet, after which the fingers 52 and 53 and the tongue or projecting plane part 54 as such are bent so as to be oriented perpendicularly to the plane support 51. The fingers 52 and 53 extend in substantially the opposite direction to the tongue or projecting plane part 54.

Figure 7:
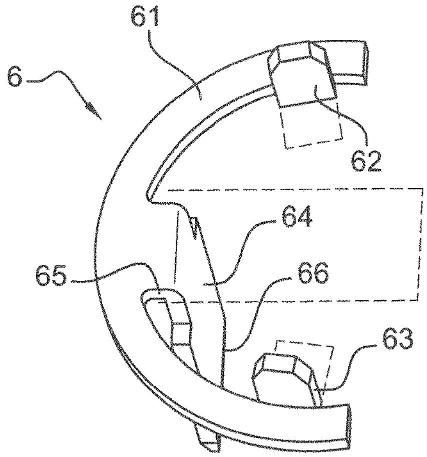
Figure 8:
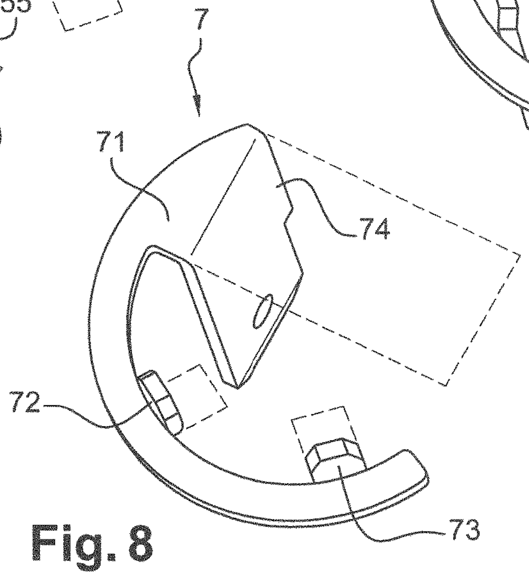

The negative connection elements 6, 7 from FIGS. 7 and 8 include the same elements but they have different dimensions and/or positions.

Accordingly, in the negative tongue 6 shown in FIG. 7, the plane part 64 forming the negative tongue 6 as such is situated between the two fingers 62 and 63, which are substantially diametrically opposite each other on the support 61. Moreover, the plane part 64 has a base 65 narrower than a main part 66 that is wider than the tongue 54 of the first electrical connection element or negative tongue 5.

In FIG. 7, the tongue 74 as such is situated at the same location as the first electrical connection element or negative tongue 5, i.e. in line with the semicircular support 71. The finger 73 is situated at a location similar to that of the finger 53 from FIG. 6, while the finger 72 is situated at a new position relative to the other two elements. The tongue as such, i.e. the plane part 74, has larger dimensions in length and in width than the tongues 54 and 64 of the first two connection elements described above.

Figure 9:
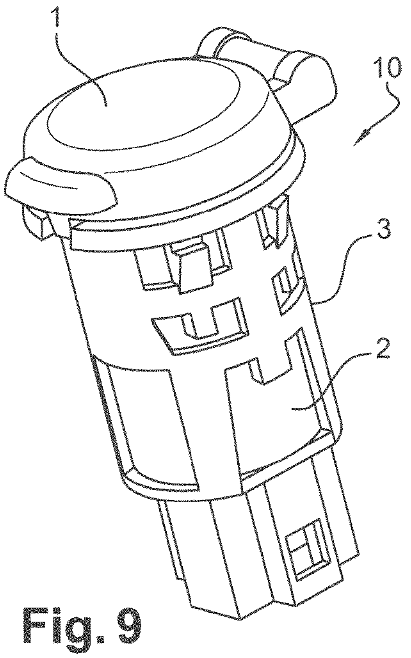
FIGS. 9 to 14 are views of different elements of the socket from FIG. 1.
Figure 10:
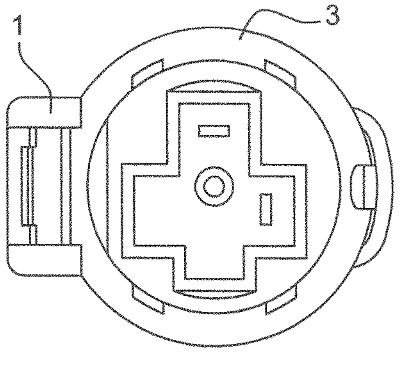

FIG. 9 shows a socket 10 produced with the elements from FIG. 1.

Figure 11:
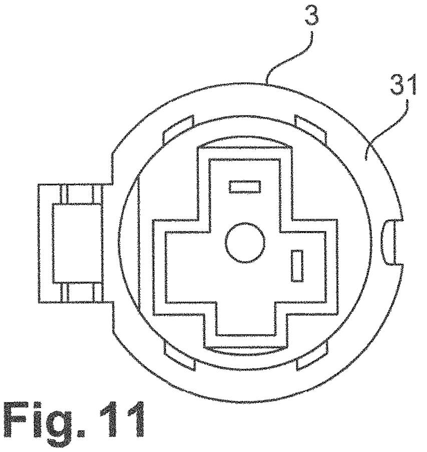

There are seen the cap 1 that enables the socket 10 to be opened to plug a connector into it and the socket body 2 that is received and retained in the base 3. The latter base 3 comprises a circular part 31, notably identified in FIG. 11, that is identical for the three sockets described here, although these bases are different so as to match the corresponding three negative tongues and the corresponding three positive tongues.

Figure 12:
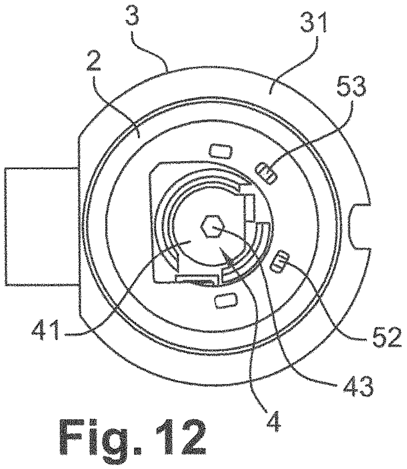

FIG. 12 is a view of the assembly in which can be seen the socket body 2 retained in the base 3, the fingers 52 and 53 of the negative tongue 5 that are fixed by crimping them in the socket body 2 and, in the middle of the base 3, a second electrical connection element 4 having a positive tongue. The socket body 2 and the base 3 sandwich the negative tongue 5 between their backs.

Figure 27:
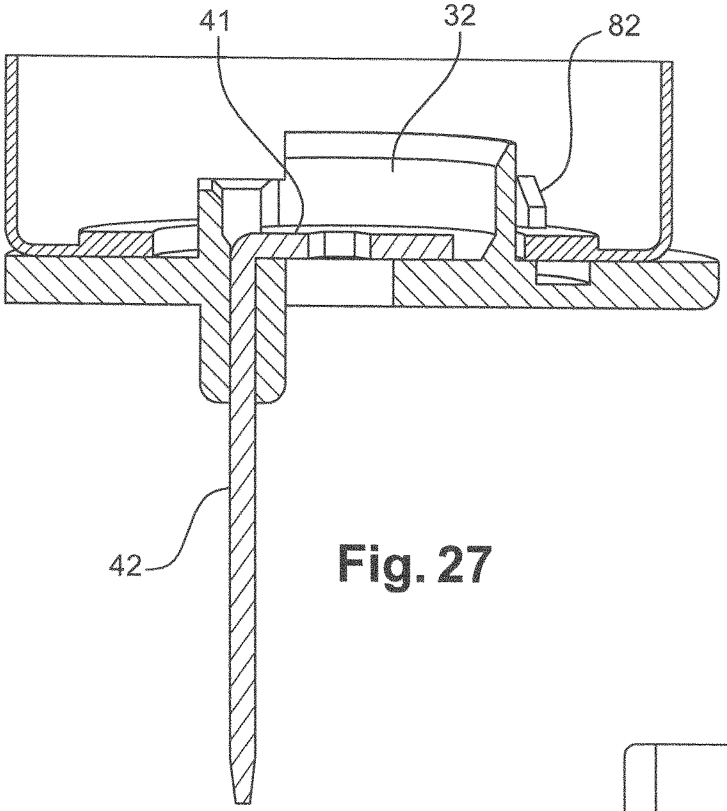
FIG. 27 is a sectional view showing the arrangement of a second connection element (positive tongue) in one of the sockets.

The arrangement of the second electrical connection element 4 with the positive tongue can also be seen in FIG. 27. It has a plane part 41 as well as the tongue 42 as such, which extends in a direction perpendicular to the plane part 41. The positive tongue 4 has at its center a hexagonal hole 43 identified in FIG. 12.

Moreover, the base 3, disposed between the socket body 2 and the positive electrical element 4, electrically insulates that positive element 14 relative to the socket body 2.

A raised pattern 32 on the back of the base 3, seen in FIG. 27, projects through the hole in the back of the body 2 and serves as an abutment when connecting a connector to this socket 10. This circular raised pattern 32 surrounds the positive tongue 42 and also separates it from the fingers of the negative tongues, for example from fingers 82 that can be seen in FIG. 27.

As indicated above, one of the particular features of this socket 10 is that the fingers 52 and 53 of the negative tongue 5 are fixed to the smaller holes 27 and 26, respectively, of the socket body 2. The fingers 52 and 53 are fixed by crushing them until they are forced into the smaller holes 27 and 26, and so the negative tongue 5 cannot be withdrawn from the socket body 2 without damaging the socket body 2 or the negative tongue 5. This type of fixing corresponds to crimping.

Figure 14:
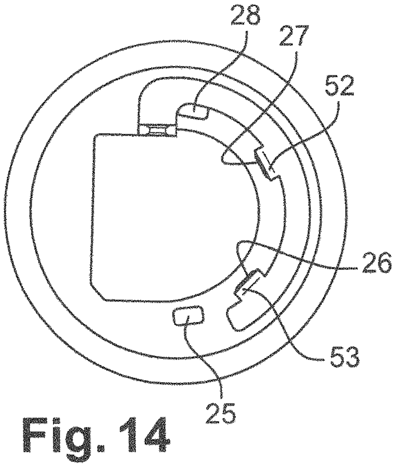
Figure 15:
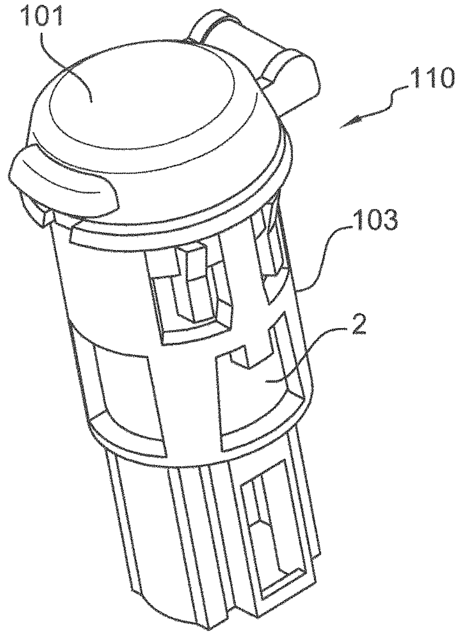
FIGS. 15 to 20 and 21 to 26 are analogous views showing two other sockets produced from this assembly.

In FIG. 14 it is also seen that the smaller holes 28 and 25 are not used for fixing the negative tongue 5.

Figure 13:
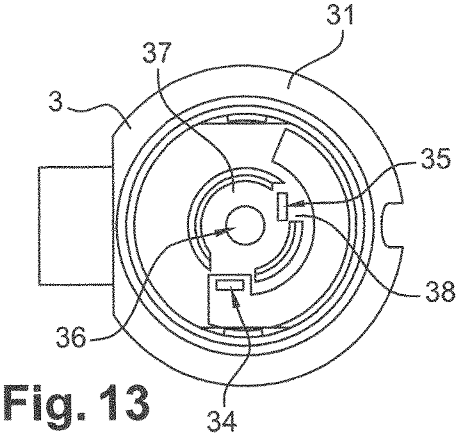

FIG. 13 is an end view similar to that of FIG. 12, but without the socket body 2 or the positive and negative tongues 4, 5. Thus a central location 37 is intended to receive the plane support 41 of the positive tongue 4 while the contours 38 of the base 3 are adapted to retain the socket body 2 in a fixed position. The base 3 also includes two rectangular openings 34 and 35 and a central hole 36.

FIGS. 15 to 20 show a second socket 110 in which the socket body 2 is identical to that of the first embodiment. Likewise, the base 103 comprises a portion 31 identical to that of the first embodiment.

Figure 20:
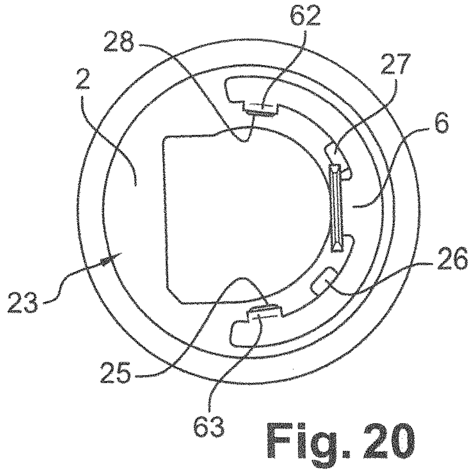

The main particular feature of this socket 110 is that it is the negative tongue 6 that is fixed to the socket body 2 instead of the negative tongue 5. As FIG. 20 shows, the fingers 62 and 63 of the negative tongue 6 are fixed to the holes 28 and 25, respectively, i.e. the holes that are at the greatest distance from one another on the semicircle of the socket body 2 at its end 23.

Here the holes 26 and 27 of the socket body 2 are not used to fix the negative tongue 6.

Figure 18:
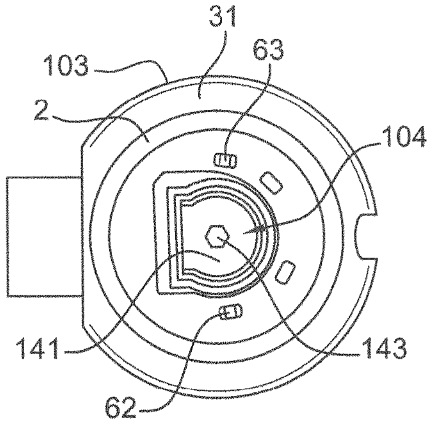

FIG. 18 is a top view of the assembly of this second socket 110, again without the cap, which comprises a positive tongue 104 different from the tongue 4 in terms of the shape of its support 141, and there are seen the fingers 62 and 63 of the negative tongue 6 fixed to the socket body 2.

Figure 16:
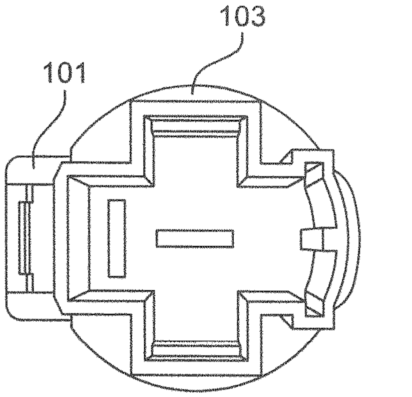
Figure 17:
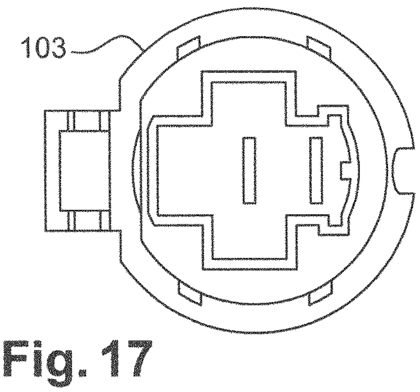
Figure 19:
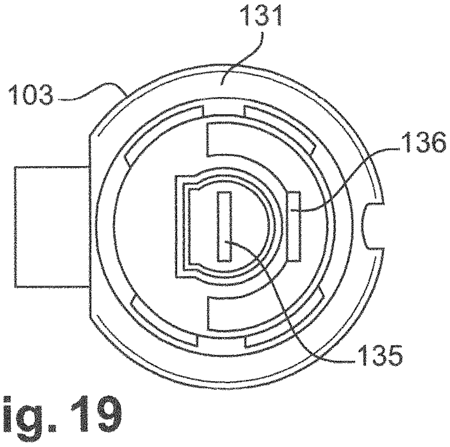

FIGS. 16, 17 and 19 are views of the base 103, which differs from the previous base 3. In particular, there is no round central hole. However, the base 103 includes two rectangular openings 135 and 136 that can be seen in FIG. 19, which this time are parallel to each other.

Figure 21:
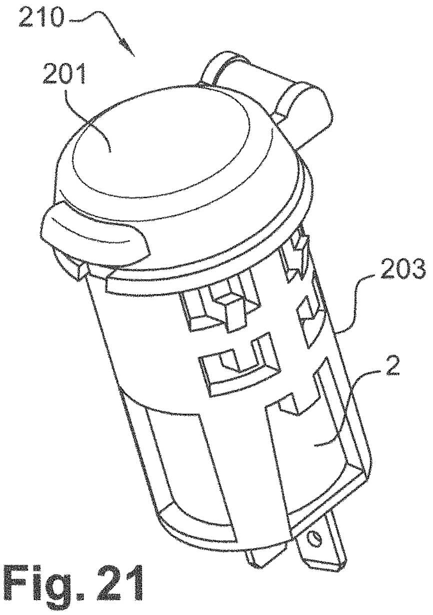
Figure 22:
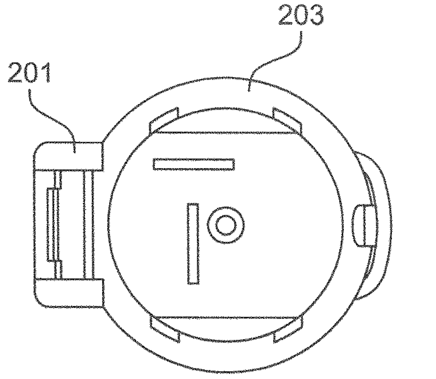
Figure 23:
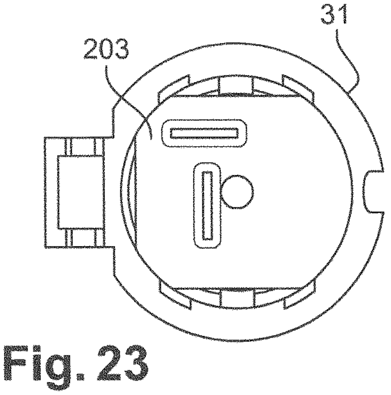
Figure 24:
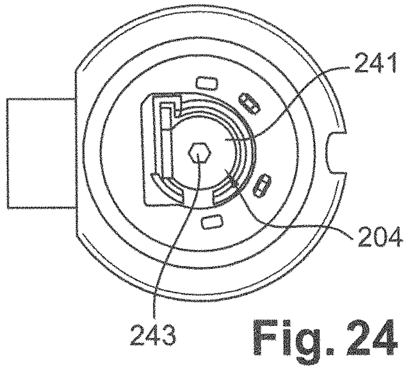
Figure 25:
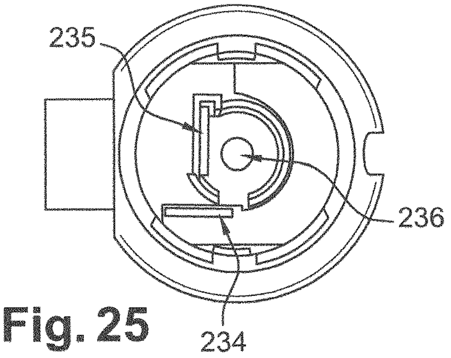
Figure 26:
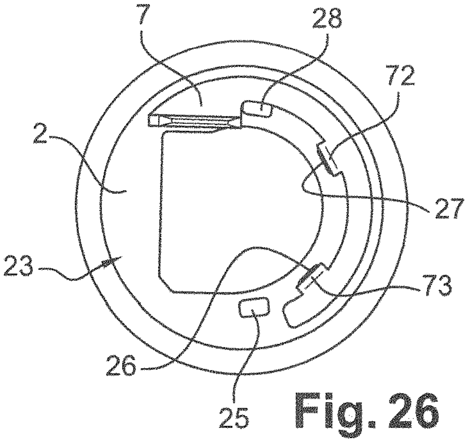

FIG. 21 shows a third socket 210. The socket body 2 is again identical, and this socket 210 has the main particular feature of including the negative tongue 7 that is fixed into the smaller holes 27 and 26 in the socket body 2 by its fingers 72 and 73, respectively, as can be seen in FIGS. 24 and 26. Thus the smaller holes 25 and 28 are not used to fix the negative tongue 7 to the socket body 2. The base 203 includes the identical portion 31, but matches the negative tongue 7 and the positive tongue that is specific to its and its support 241, seen in FIG. 24. In particular, the rectangular openings 234 and 235 are perpendicular, like those of the first socket 10, but are longer, as shown in FIG. 25, while there is a round central hole 236, unlike the support of the second socket 210.

The socket body 2 is therefore adapted to receive the three types of negative tongue elements, but only one at a time.

Figure 28:
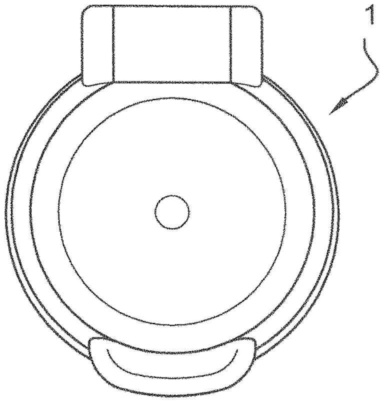
FIGS. 28 and 29 are top views of two caps of the aforementioned sockets.
Figure 29:
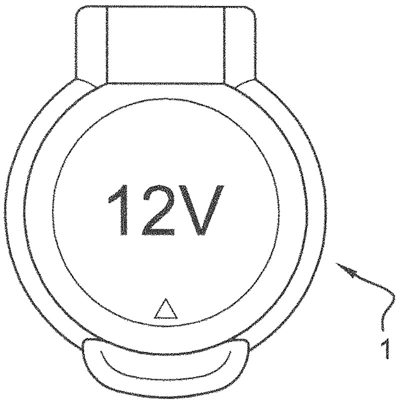

Finally, FIGS. 28 and 29 show two possible types of opening cap for the various sockets. The cap 1 from FIG. 28 is conventional while the cap 1 from FIG. 29 is chromium-plated and carries markings (for example "12 V").

These sockets can therefore be manufactured from an assembly comprising:

identical sockets bodies 2, and first negative electrical connection elements 5, here of three types. The elements of each type are identical to one another and different from those of the other types. They correspond to the aforementioned sockets. Each element is adapted to be fixed to one of the bodies in a predetermined position on the body such that another element can then no longer be fixed to the body. Moreover, for each element fixed to a body in a predetermined position via the holes of that body, only some of those holes are used to fix it. In other words, some of the fixing holes of the body are left free when an element is fixed to the body. Depending on the type of element fixed to the body, different holes are used. Likewise, different holes are left free.

The assembly also comprises bases 3 adapted to be fixed to the body 2. Here the bases are also of three types that differ from one another but include an identical portion 31.

The assembly further comprises three different types of second positive electrical connection elements 4.

It finally comprises two different types of caps for closing a housing of the socket, for example.

For the manufacture of a socket, such an assembly is procured and one of the negative elements 5, 6 or 7 is fixed to the body 2. One of the positive elements is also added, plus a base and a cap.

This assembly therefore makes it possible to manufacture three different types of sockets and therefore to obtain an assembly that here comprises three different socket types. Here each socket comprises five components in total.

Of course, numerous modifications could be made to the invention without departing from the scope thereof.

The number of positive or negative connection elements that are different, the number of bases and the number of caps in the assembly could be modified.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. An assembly for producing a socket for a vehicle passenger compartment, the assembly comprising:

at least one base;

a socket body adapted to be received in said at least one base; and a plurality of electrical connection elements adapted to be fixed to said socket body;

said socket body comprising a plurality of attachment holds at a region thereof, each one of said plurality of electrical connection elements having a plurality of fingers or tongues for securing each of said plurality of electrical connection elements to said socket body, with each of said plurality of electrical connection elements using a different subset of said plurality of attachment holds.

2. The assembly according to claim 1, wherein each of said plurality of electrical connection elements being adapted to be fixed to said socket body in at least one predetermined position on said socket body such that the other of said plurality of electrical connection elements cannot then be fixed to said socket body in said at least one predetermined position corresponding to the other of said plurality of electrical connection elements.

3. The assembly according to claim 1, wherein said socket body includes at least one hole for fixing at least one of said plurality of electrical connection elements to said socket body in a predetermined position corresponding to said at least one of said plurality of electrical connection elements.

4. The assembly according to claim 3, wherein said socket body includes at least two holes, preferably four holes.

5. The assembly according to claim 4, wherein said plurality of electrical connection elements is adapted to be fixed to said socket body by means of at least two of said at least two holes of said socket body.

6. The assembly according to claim 1, wherein said plurality of electrical connection elements comprises a plane support, at least one finger and a tongue, both projecting from said plane support.

7. The assembly according to claim 1, wherein said at least one base is adapted to be fixed in a predetermined position to said socket body.

8. The assembly according to claim 7, wherein said at least one base is a ring.

9. The assembly according to claim 7, wherein said at least one base includes a raised projection that forms an abutment in said socket on receiving a connector.

10. The assembly according to claim 1, wherein said plurality of electrical connection elements being one or more first elements, the assembly further comprises at least two different second electrical connection elements.

11. The assembly according to claim 1, further comprising at least two different caps for closing a housing of said socket.

12. A method of manufacturing said socket for a vehicle passenger compartment, wherein an assembly according to claim 1 is procured and at least one of said plurality of electrical connection elements is fixed to said socket body.

13. The assembly according to claim 2, wherein said socket body includes at least one hole for fixing said plurality of electrical connection elements to said socket body in said predetermined position corresponding to said plurality of electrical connection elements.

14. The assembly according to claim 2, wherein said plurality of electrical connection elements comprises a plane support, at least one finger and a tongue, both projecting from said plane support.

15. The assembly according to claim 3, wherein said plurality of electrical connection elements comprises a plane support, at least one finger and a tongue, both projecting from said plane support.

16. The assembly according to claim 2, which further comprises at least one base adapted to be fixed in a predetermined position to said socket body.

17. The assembly according to claim 6, which further comprises at least one base adapted to be fixed in a predetermined position to said socket body.

18. The assembly according to claim 8, wherein said at least one base includes a raised projection that forms an abutment in said socket on receiving a connector.

19. A socket intended for a vehicle passenger compartment and comprising:

at least one base;

a socket body adapted to be received in said at least one base; and a plurality of electrical connection elements adapted to be fixed to said socket body;

said socket body comprising a plurality of attachment holds at a region thereof, each one of said plurality of electrical connection elements having a plurality of fingers or tongues for securing each of said plurality of electrical connection elements to said socket body, with each of said plurality of electrical connection elements using a different subset of said plurality of attachment holds.

20. A group of at least two sockets according to claim 19, said socket bodies of said at least two sockets being identical, said electrical connection element for each socket body being different from one another and each being fixed to one of said socket bodies in a predetermined position, the fixing in position of each said electrical connection element for each socket body making it impossible to fix the other of said electrical connection element to the same socket body at a corresponding position.

* * * * *